(12) United States Patent
Hausmann et al.

(10) Patent No.: US 7,074,494 B2
(45) Date of Patent: Jul. 11, 2006

(54) FLAME RETARDANT SURFACE COVERINGS

(75) Inventors: Karlheinz Hausmann, Auvernier (CH); Robert V. Kasowski, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 210 days.

(21) Appl. No.: 10/782,211

(22) Filed: Feb. 19, 2004

(65) Prior Publication Data

US 2005/0186440 A1    Aug. 25, 2005

(51) Int. Cl.
*B32B 27/08* (2006.01)
*B32B 27/30* (2006.01)

(52) U.S. Cl. ............................ 428/520; 428/522
(58) Field of Classification Search ................ 428/520
See application file for complete search history.

(56) References Cited

U.S. PATENT DOCUMENTS 3,264,272 A    8/1966  Rees
5,137,937 A    8/1992  Huggard et al.
5,728,476 A    3/1998  Harwood et al.
6,866,928 B1*  3/2005  Narum et al. ............... 428/354

FOREIGN PATENT DOCUMENTS

WO    WO 95/10842    4/1995

OTHER PUBLICATIONS

Robert D. Lundberg, "Ionic Polymers", Encyclopedia of Polymer Science and Engineering, 1987, pp. 393-423, vol. 8, Wiley-Interscience.
Claude J. Schmidle, Robert P. Conger, "Flooring Materials", Encyclopedia of Polymer Science and Engineering, 1987, pp. 233-247, vol. 7, Wiley-Interscience.
PCT International Search Report for International application No. PCT/US2004/005919 dated Jul. 30, 2004.

* cited by examiner

*Primary Examiner*—D. S. Nakarani

(57) ABSTRACT

Flame retardant polymer compositions, especially ionomer polymer compositions, are prepared using ethylene diamine phosphate and used as surface coverings and building materials.

10 Claims, No Drawings

FLAME RETARDANT SURFACE COVERINGS

This application claims the benefit of U.S. Provisional Application No. 60/449,522, filed Feb. 24, 2003.

FIELD OF INVENTION

The invention relates to the use of ethylene diamine phosphate as a flame retardant in surface coverings and building materials.

TECHNICAL BACKGROUND

PVC building materials have enjoyed considerable commercial success but suffer from a number of disadvantages. Plasticized PVC is slightly yellow in color, and it tends to become more yellow on exposure to the amounts of UV light normally occurring in interior environments. The clarity and visual appearance of a plasticized PVC wear layer and the visual appearance of a decorative layer such as a printed patterned layer through a transparent or translucent wear layer are therefore not as good as could be desired. The resistance of building materials, especially countertops and flooring, to wear, abrasion, scratching and scuffing is not as great as could be desired. Vinyl building materials are marred by exposure to heat, for example lit cigarettes. The use of vinyl building materials has been objected to on environmental grounds, both in that they contain the chlorinated polymer PVC and in that they contain volatile organic compounds as plasticizers.

Ionomer resins which are thermoplastic copolymers based on an olefin and an alpha, beta-unsaturated carboxylic acid are well-known. They are described for example in an article entitled "Ionic Polymers" in Encyclopedia of Polymer Science and Engineering, Wiley-Interscience, Volume 8 (1987), pages 393–423. Most are available commercially, in many grades, for example from Du Pont under the trademark Surlyn®. They have been used as wear resistant components of building materials as described in U.S. Pat. No. 5,728,476. Since they contain no halogen they are environmentally preferable to PVC, however they require the use of additives in order to obtain the flame retardancy required by many government regulations.

Ethylene diamine phosphate (EDAP) has been used along with many other flame retardant additives (FR) in many different polymer compositions. It has the advantage that it does not contain undesirable elements such as halogens or heavy metals. However, since EDAP can have solubility problems and processing problems at higher temperatures, it has been used combined with other flame retardant additives or syngeristic additives. Additionally, use of EDAP can lead to undesirable properties of the processed polymer such as oily surface feel and cloudiness. U.S. Pat. No. 5,137,937 describes a polymer system containing thermoplastic resins and EDAP. However, that patent only exemplifies polyolefins and acetate resins.

There is a need for polymeric systems useful for surface coverings and other building materials that exhibit flame retardancy without the use of halogens but also have wear-resistant, preferably clear, coatings. Applicants have made the surprising discovery that combining two different layers, one layer containing EDAP, and the other a layer that imparts wear-resistance, will result in a composition that will pass government flame resistancy standards for building materials.

SUMMARY OF THE INVENTION

The invention is directed to a article comprising:
a) a first layer comprising acrylate polymer and ethylene diamine phosphate (EDAP); and
b) a second layer comprising an ionomer polymer.

In a preferred embodiment, the article is a sheet. The invention is also directed to a wall, ceiling, or flooring covering, or an external or internal surface covering in an automotive, motorcycle, or truck, comprising the article described above, in the form of a sheet.

The EDAP is preferably at a weight percent of about 51% to 80%.

Preferably, the first layer has a thickness of about 0.5 mm to 2 mm and the second layer has a thickness of about 0.3 mm to 0.6 mm.

Preferably the article has a flame resistance of DIN 1402-14, as measured by the German Institute for Standardization method.

Also preferably the ionomer polymer is transparent, and the acrylate polymer is a copolymer of ethylene and methyl, ethyl, or butyl acrylate.

DETAILED DESCRIPTION OF THE INVENTION

The present invention provides an article, preferably in the form of a sheet, comprising a) a first layer comprising an acrylate polymer and ethylene diamine phosphate; and b) a second layer comprising an ionomer polymer. Preferably the ionomer polymer is transparent. Additional layers, either the same or different as layers a) and b) may also be present.

By the term "article" herein is meant an individual item or thing. By the term "sheet" it is meant an article with a length and width which are substantially greater than its thickness, such as a sheet, tile or board. Such articles may also be designed for use as wall, ceiling, or other surface coverings, with either total or partial coverage, and are usually applied with an adhesive. The sheets are suitable for use in homes, commercial or public buildings, or for automotive uses. In automobiles, trucks and other vehicles they can be used internally or externally as fascia, seat components, bumpers, flooring, and dashboard coverings, and as truck tarpaulins or roofing membranes. In homes and building they can be used as coverings for walls, ceilings or floors, counters and other surfaces, and cabinetry. Ionomer polymers include ethylene based polymers or copolymers of ethylene, ethylenically unsaturated $C_3$–$C_8$ carboxylic acid, and optionally one or more softening comonomers copolymerizable with ethylene, and blends of two or more polymers or copolymers thereof. The ethylenically unsaturated $C_3$–$C_8$ carboxylic acid is preferably present in an amount of about 3 weight % –25 weight %, relative to the weight of the polymer. The softening comonomer is preferably present in an amount of less than about 25 weight %, relative to the weight of the polymer. Acrylic and methacrylic acids are preferred acid comonomers. The softening comonomer can be an alkyl acrylate selected from the group consisting of methyl acrylate, n-propyl-, iso-butyl-, n-butyl-, n-octyl-, 2-ethyihexyl-, and 2-methoxyethyl-acrylates. The preferred alkyl acrylates are iso-butyl-, n-butyl-, 2-ethylhexyl-, and 2-methoxyethyl-acrylates. The softening comonomer can also be an alkyl vinyl ether selected from the group consisting of n-butyl-, n-hexyl-, 2-ethylkexyl-, and 2-methoxyethyl-vinyl ether. The preferred alkyl vinyl ethers are n-butyl vinyl ether and n-hexyl vinyl ether.

The ionomer polymer is optionally about 0.01 to 99.5% neutralized with metal ions selected from groups 1, 2, 4, 6, 8, 11, and 13 of the Periodic Table of elements. Typically, neutralization will be from about 10–70%. Preferably the polymer has from about 35 to about 70% of the carboxylic acid groups ionized by neutralization with metal ions selected from the group consisting of sodium, potassium, zinc, calcium, lithium and magnesium. Ionomers and their methods of manufacture are described in U.S. Pat. No. 3,264,272.

For the present invention, preferred ionomer polymers include Surlyn® thermoplastic resins (E. I. du Pont de Nemours and Company). Most preferred are Surlyn types with a haze value according to ASTM D1003 of lower than 10%.

Transparency can be quantified by Haze testing according to ASTM D1003 A, wherein a 6.4 mm thick plaque should have a haze value of smaller than 35%.

Acrylate polymers include ethylene based polymers or copolymers of ethylenic monomers, ethylenically unsaturated C3–C8 carboxylic acid esters, and optionally one or more additional comonomers copolymerizable with ethylene, and blends of two or more polymers or copolymers thereof. The ethylenic monomer is preferably present in an amount of about 0 to about 40 weight %, relative to the weight of the polymer. Ethylenic monomers useful as the first monomeric component include vinyl olefin monomers having a terminal point of unsaturation capable of undergoing polymerization reactions, such as ethylene, propylene, butene, pentene, hexene, heptene and octene, as well as other isomers of butene, pentene, hexene, heptene and octene. Preferably the ethylenic monomer is ethylene.

Ethylenically unsaturated C3–C8 carboxylic acid esters are preferably present in an amount of about 60–100 weight %, relative to the weight of the polymer, and include acrylate class esters formed from an unsaturated carboxylic acid, such as acrylic acid, methacrylic acid, alpha-chloroacrylic acid, crotonic acid, maleic acid, fumaric acid, itaconic acid, cinnamic acid, and mixtures thereof. Preferably the esters are present in an amount of about 5–40 weight %; more preferably about 9–25 weight %. The acrylate class esters for use with the present invention are based upon unsaturated acrylic class acids, such as ethyl acrylic acid, methyl acrylic acid, and the like, and includes as the ester component linear or branched chain alkyl groups having from 1 to about 20 carbon atoms. Preferred acrylate ester compositions include, but are not limited to, pentyl acrylate, pentyl methacrylate, n-butyl acrylate, iso-butyl acrylate, n-butyl methacrylate, propyl acrylate, propyl methacrylate, ethyl acrylate, ethyl methacrylate, methyl methacrylate, methyl acrylate, iso-bornyl acrylate, iso-bornyl methacrylate and tetrahydrofurfuryl acrylate.

The additional comonomers are preferably present in an amount of less than about 20 weight %, preferably less than about 13 weight %, relative to the weight of the polymer. Monomers useful as the third monomeric component include carbon monoxide, anhydride monomer.

Preferred acrylate polymers for the present invention include, but are not limited to, Elvaloy® copolymers (copolymers of ethylene/vinyl acetate/carbon monoxide, ethylene/n-butyl acrylate/carbon monoxide, or ethylene/n-butyl acrylate/glycidyl methacrylate), Elvaloy® AC (ethylene/methyl, ethyl, and butyl acrylate copolymers), Elvaloy® ACSI (ethylene (methyl, ethyl, buthyl) acrylate/vinyltrimethylsilane or vinyltriethylsilane copolymers), Vamac® ethylene/acrylic elastomers (ethylene/methyl acrylate and ethylene/methyl acrylate MAME copolymers), and Surlyn® thermoplastic resins (ethylene acrylic and methacrylic acid ionomer, optionally neutralized). Most preferred polymers include Elvaloy® AC.

Other ingredients may be added to any or all of the polymer compositions described above. In addition to the components discussed above, the compositions of this invention may contain additives commonly employed with synthetic polymers, such as flame retardant additives, colorants, mold release agents, antioxidants, tougheners, nucleating agents, ultraviolet light stabilizers, heat stabilizers, releasing agents, co-agents, crosslinking agents, and the like. These ingredients are each typically used in proportions of less than 1%.

EDAP can be mixed with the various polymers described above using conventional polymer mixing equipment such as a two-ball mill, Brabender, or Banbury. The EDAP is preferably present in a weight amount of about 51% to about 80%, more preferably about 60% to about 65%.

Preferably the first layer has a thickness of about 0.5 to about 2 mm, and the second layer has a thickness of about 0.3 to about 0.6 mm. The sheet of the present invention can also comprise additional layers, such as but not limited to adhesives layers, decorative layers, colored layers, and stability layers.

Resilient coverings for surfaces, which include for example vinyl tiles and vinyl sheet, are well known. They are described, for example, in an article entitled "Flooring Materials" in Encyclopedia of Polymer Science and Engineering, Wiley-Interscience, Volume 7 (1987), pages 233–247. Such coverings, as described in that article, are composite materials which comprise a transparent or translucent wear (upper) layer, a decorative layer such as a printed patterned layer and one or more backing (lower) layers. The wear layer of a resilient vinyl covering according to that article typically consists of a plasticized PVC (polyvinyl chloride) composition. The printed patterned layer may for example be a printed acrylic or PVC film. The backing layer adjacent such a printed patterned layer commonly contains one or more white or other colored pigments to enhance the appearance of the printed patterned layer as seen through the wear layer, and this type of backing layer may be called a face ply. Such composite coverings are commonly laminates, the composition of each layer in the laminate being chosen so as to provide a desired balance of physical properties both in that layer and in the floor covering as a whole. Resilient coverings are also known which comprise a decorative, for example pigmented, opaque vinyl wear layer laminated to one or more backing layers.

EXAMPLES

The polymers were prepared using a Brabender® PL-2100 plasti-corder, type DR 2051 with 2-zone electrically heating and 680 cc$^3$ head with prop mixer cam blades. The Brabender® was heated to 170° C. The Elvaloy® 3717 EBA AC polymer (E. I. DuPont de Nemours, Wilmington, Del.) was next put into the unit, letting it melt and mix for 2 minutes. Next the other ingredients were added, and allowed to melt and mix for 4.5 minutes. The Casico® used was Casico® 4807 manufactured by Borealis Compounds LLC, Rockport, N.J. After this time, the Brabender® was shut down and the sample was removed. The sample was then ground down, to approximately ⅛ inch pellets, on a Wiley mill. The final product was placed in plastic bags with absorbent packs until pressing.

For the pressing, the temperature was set for 150° C. A sandwich was made as follows:

Press Plate
Trifoil® T303 (Saint-Gobain Performance Plastics, Wayne, N.J.)
Chase (2-mm thickness), filled evenly with ground-up final product form Wiley mill
Trifoil® T303
Press Plate The sandwich was loaded into the press, and the press closed until the plates were compressed. The sandwich was held for 1 minute with no pressure applied. 150 tons pressure was then applied and held for 2 minutes. The press was lowered and the sandwich was removed, followed by the removal of the press plates. Air was then blown on the reduced sandwich until it was cool to the touch. The trifoil was removed from both sides with the sample remaining in the chase.

Another sandwich was made same as the previous sandwich using 0.3-mm and 0.6-mm chases for Surlyn® 9910. Both chases were sandwiched between the press plates/trifoils and placed into press. The press was closed until plates were compressed with no pressure applied and held for 1 minute. Slight pressure (250 PSI) was applied for another minute, when the press was lowered and the press plates removed. Air was then blown on until cool to the touch. The laminated sample was then removed from both chases.

The flammability of the laminated film was tested using the German Institute for Standardization method DIN 1402-14, "Fire behaviour of buildings materials and elements—Determination of the burning behaviour of floor covering systems using a radiant heat source". In summary, a sample of a size of 23×105 cm was put horizontally into a chamber. After being conditioned for 3 days at 50% relative humidity and room temperature the sample was fixed without glue onto an inflammable backing layer. The chamber consisted of a burner that can be turned away from the sample on one side with a radiant panel fixed in an angle of about 30° to the sample that provides a constant heat flux onto the sample surface. This heat flux will diminish as a function of the distance to the burner due to the 30° angle of the radiant panel. After the sample had been conditioned for 2 minutes in the burn chamber at 150° C., the burner burned the sample from the top for 10 minutes without interruption. The burner was then turned away from the sample allowing the sample to burn by itself under the influence of the radiant panel. In addition to the burner and the radiant panel there is a constant air flux originating behind the burner and exiting on the top of the chamber on the other extremity of the sample which provided fresh air at a rate of 2.5 m/s to further support the fire. During the test occasionally bubbles formed at the sample surface. The sample passed the test if the burn distance was less than 28 cm.

The results are shown below in Table 1.

TABLE 1

| Example | EBA 3717 % | EDAP % | $CaCO_3$ % | $MgOH_2$ % | Surlyn ® 9910 Thickness Mm | Burn Distance (cm) | Heat Rate (kW/m$^2$) |
|---|---|---|---|---|---|---|---|
| Comp. 1 | 40 | 40 | 10 | 10 | 0.3 | 42 | 4.91 |
| Comp. 2 | 35 | 50 | 15 | 0 | 0.3 | 40 | 5.28 |
| Comp. 3 | 35 | 50 | 15 | 0 | 0.3 | 34 | 6.45 |
| Comp. 4 | 40 | 60 | 0 | 0 | 0.6 | 30 | 7.28 |
| 5 | 35 | 65 | 0 | 0 | 0.6 | 8 | 11.23 |
| Comp. 6 | 40 | 40 | 20 | 0 | 0.3 | 39 | 5.46 |
| 7 | 40 | 40 | 10 | 10 | 0.6 | 3 | 11.60 |
| 8 | 40 | 40 | 10 | 10 | 0.6 | 3 | 11.60 |
| Comp. 9 | 40 | 40 | 10 | 10 | 0.3 | 42 | 4.91 |
| Comp. 10 | 35 | 50 | 15 | 0 | 0.3 | 34 | 6.45 |
| Comp. 11 | 40 | 60 | 0 | 0 | 0.6 | 30 | 7.28 |
| 12 | 40 | 60 | 0 | 0 | 0.6 | 4 | 11.5 |
| 13 | 40 | 60 | 0 | 0 | 0.3 | 4 | 11.5 |
| 14 | 35 | 65 | 0 | 0 | 0.6 | 8 | 11.23 |
| 15 | 60 | 40 | 0 | 0 | 0.6 | 3 | 11.60 (upside down) |
| 16 | 60 | 40 | 0 | 0 | 0.3 | 40 | 5.28 |

What is claimed is:

1. An article comprising:
   a) a first layer comprising acrylate polymer and ethylene diamine phosphate; and
   b) a second layer comprising an ionomer polymer
wherein the acrylate polymer selected from copolymer of ethylene, n-butyl acrylate, and carbon monoxide; copolymer of ethylene, n-butyl acrylate, and glycidyl methacrylate, copolymer of ethylene and methyl acrylate; copolymer of ethylene and ethyl acrylate; copolymer of ethylene and butyl acrylate; copolymer of ethylene, methyl acrylate, and vinyltrimethylsilane; copolymer of ethylene, ethyl acrylate, and vinyltrimethylsilane; copolymer of ethylene butyl acrylate, and vinyltrimethylsilane; copolymer of ethylene, methyl acrylate, and vinyltriethylsilane; copolymer of ethylene, ethyl acrylate, and vinyltriethylsilane; copolymer of ethylene butyl acrylate, and vinyltriethylsilane; ethylene/acrylic elastomer; ionomer of ethylene and acrylic acid; or ionomer of ethylene and methacrylic acid.

2. The article of claim 1 in the form of a sheet.

3. The sheet of claim 2 covering a surface of an article selected from the group consisting of a wall, ceiling, floor covering, and an external or internal surface covering for an automobile, motorcycle or truck.

4. The article of claim 1 or the sheet of claim 2 wherein the flame resistance is DIN 1402-14 as measured by the German Institute for Standardization method.

5. The article of claim 1 or the sheet of claim 2 wherein the ionomer polymer is transparent.

6. The article or sheet of claim 4 wherein the ionomer polymer in the second layer is copolymer of ethylene and ethylenically unsaturated $C_3$–$C_8$ carboxylic acid; copolymer of ethylene, ethylenically unsaturated $C_3$–$C_8$ carboxylic acid, and one or more softening comonomer selected from an alkyl acrylate or an alkyl vinyl ether; and mixtures of two or more of said copolymers; wherin the alkyl acrylate is methyl acrylate, n-propyl acrylate, iso-butyl acrylate, n-butyl acrylate, n-octyl acrylate, 2-ethylhexyl acrylate, or 2-methoxyethyl acrylate, and the alkyl vinyl ether is n-butyl vinyl ether, n-hexyl vinyl ether, 2-ethylhexyl vinyl ether, or 2-methoxyethyl vinyl ether.

7. An article of claim 1 or sheet of claim 2 wherein the ionomer has about 10–70% of the carboxylic acid groups neutralized with sodium ions, potassium ions, zinc ions, calcium ions, lithium ions, or magnesium ions.

8. The article as of claim 1 or sheet as of claim 2 wherein the acrylate polymer is a copolymer of ethylene methyl acrylate, copolymer of ethylene and ethyl acrylate, or copolmer of ethylene and butyl acrylate.

9. The article of claim 1 or sheet of claim 2 wherein the ethylene diamine phosphate is present in the range of about 51 weight percent to about 80 weight percent in the first layer.

10. The article or sheet of claim 9 wherein the ethylene diamine phosphate is present in the range of about 60 weight percent to about 65 weight percent in the first layer.

* * * * *